United States Patent
Kochura et al.

(10) Patent No.: US 12,487,800 B2
(45) Date of Patent: Dec. 2, 2025

(54) REBUILDING CONTAINER EVENT LOGIC FROM SECONDARY AND TERTIARY SYSTEMS

(71) Applicant: INTERNATIONAL BUSINESS MACHINES CORPORATION, Armonk, NY (US)

(72) Inventors: Nadiya Kochura, Bolton, MA (US); Jonathan D. Dunne, Dungarvan (IE); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 18/340,817

(22) Filed: Jun. 23, 2023

(65) Prior Publication Data
US 2024/0427578 A1 Dec. 26, 2024

(51) Int. Cl.
*G06F 8/35* (2018.01)
*G06F 8/41* (2018.01)

(52) U.S. Cl.
CPC ............... *G06F 8/433* (2013.01); *G06F 8/35* (2013.01)

(58) Field of Classification Search
CPC ................................. G06F 8/35; G06F 8/433
See application file for complete search history.

(56) References Cited

U.S. PATENT DOCUMENTS

| | | | |
|---|---|---|---|
| 9,588,815 B1 | 3/2017 | Mistry | |
| 11,314,614 B2 | 4/2022 | Porras | |
| 11,561,850 B1 | 1/2023 | Banerjee | |
| 11,586,482 B2 * | 2/2023 | Che | G06F 9/4881 |
| 2017/0109536 A1 | 4/2017 | Stopel | |
| 2020/0012551 A1 * | 1/2020 | Liang | G06F 16/2455 |
| 2021/0211408 A1 * | 7/2021 | Porras | G06N 3/045 |
| 2023/0036739 A1 * | 2/2023 | Deppisch | G06F 9/45558 |
| 2024/0193032 A1 * | 6/2024 | Tang | G06F 11/0775 |

FOREIGN PATENT DOCUMENTS

WO 2017101252 A1 6/2017

OTHER PUBLICATIONS

Disclosed Anonymously, "Systematic Problem Determination and Security Inspection for Microservices," IPCOM000263997D, IP.com, Oct. 29, 2020, 4 pages.
"Configure Logging Drivers", downloaded Mar. 28, 2023 from https://docs.docker.com/config/containers/logging/configure, 4 pgs.

(Continued)

*Primary Examiner* — Ziaul A Chowdhury
(74) *Attorney, Agent, or Firm* — CHIP LAW GROUP

(57) ABSTRACT

A method for tuning software container interdependent systems includes receiving, by a computer processor operating a prediction engine, data from one or more software containers. The data includes operations from one or more software applications in the software containers. The prediction engine identifies a plurality of dependencies in the operations. The prediction engine develops a model of interdependencies based on the identified dependencies. The prediction engine determines one or more failure candidates in the identified dependencies. The prediction engine generates a software architecture template based on the identification of failure candidates.

11 Claims, 4 Drawing Sheets

(56) References Cited

OTHER PUBLICATIONS

Benitez, L. "Life and Death of a Container", downloaded Mar. 28, 2023 from, https://medium.com/devopsion/life-and-death-of-a-container-146dfc62f808, 12 pgs.

Montgomery, M. et al., "Graph-Driven Dependency Tracking of Container and Package Relationships", Cisco Systems, Inc., IPCOM000253343D, IP.com, Mar. 23, 2018, 6 pages.

\* cited by examiner

REBUILDING CONTAINER EVENT LOGIC FROM SECONDARY AND TERTIARY SYSTEMS

BACKGROUND

Technical Field

The present disclosure generally relates to computing architecture, and more particularly, to rebuilding container event logic from secondary and tertiary systems.

Description of the Related Art

In a conventional software deployment scenario, hardware and an operating system may run multiple applications. To run a specific software application within an environment running multiple application, the application may have certain dependencies, which may involve certain libraries. Each software application running concurrently will involves its own library as well as dependencies. Often, a conflict may arise because each application may be free to solicit disparate libraries specific to some version. Indeed, some applications may refer to a different version of the same library.

Software containers are a layer in software architecture that packages code together with the dependencies associated with pieces of code. When code is being performed, software systems generally refer to a container to identify which other pieces of code are affected by the first code's operation. Containers generally have a temporal lifecycle. When a system degrades, typically there is no immediate way to recreate an event associated with or causing the degradation. For example, when a container encounters a problematic event, current approaches generally destroy the container and recreate a new version of the container. However, the inherent problem conditions (for example, different applications depending on different versions of software applications) may persist after recreation. In systems where multiple layers of containers exist, identifying the root of the problem may be difficult because there can be multiple dependencies tied to a piece of code.

SUMMARY

The embodiments in general provide an improvement for software architecture interdependent systems. The embodiments use computer implemented processes to log the events performed by source code and software applications in a software container. The logged events are used to create models that predict dependency relationships where a failure or fault is likely to occur. This is an improvement over previous software container diagnostic methods that simply reverse engineer faults or reset containers because these approaches merely allow the source of failure to persist after reset. The current embodiments address the likely points of failure so that the sources causing dependency breakdowns can be replaced or revised with a different dependency scheme. As systems scale larger, templates from the models may be used to tune software architecture in other systems to use more reliable dependency schemes.

According to an embodiment of the present disclosure, a computer program product for tuning software container interdependent systems includes one or more computer readable storage media, and program instructions collectively stored on the one or more computer readable storage media. The program instructions include receiving, by a computer processor operating a prediction engine, data from one or more software containers. The data includes operations from one or more software applications in the software containers. The prediction engine identifies a plurality of dependencies in the operations. The prediction engine develops a model of interdependencies based on the identified dependencies. The prediction engine determines one or more failure candidates in the identified dependencies. The prediction engine generates a software architecture template based on the identification of failure candidates.

In one embodiment, which may be combined with the preceding embodiment, the prediction engine performs a statistical analysis of source code and the one or more software applications. A plurality of operation associated events are logged from the statistical analysis. The identified plurality of dependencies are identified from the logged operation associated events. These features allow for the method to accumulate and analyze the relationships between events in the software container (and between connected containers) so that the different event types can be statistically analyzed for their correlation with failed dependencies. The statistical analysis improves the predictive quality of the model so that other architectures that use any dependencies that show a high statistical probability of failing can be guided away from those dependencies.

According to an embodiment of the present disclosure, a method for tuning software container interdependent systems includes receiving, by a computer processor operating a prediction engine, data from one or more software containers. The data includes operations from one or more software applications in the software containers. The prediction engine identifies a plurality of dependencies in the operations. The prediction engine develops a model of interdependencies based on the identified dependencies. The prediction engine determines one or more failure candidates in the identified dependencies. The prediction engine generates a software architecture template based on the identification of failure candidates.

In one embodiment, which may be combined with the preceding embodiment, the prediction engine assigns a probability of dependency value to the logged operation associated events. It will be appreciated that the model may use the probability of dependency value to improve the accuracy of predicting iterations in software architecture constructs and the likely dependencies used in those constructs.

According to an embodiment of the present disclosure, a computing device for tuning software container interdependent systems includes a computer processor operating a prediction engine and a memory coupled to the computer processor. The memory stores instructions to cause the computer processor to perform acts including receiving, by the computer processor data from one or more software containers. The data includes operations from one or more software applications in the software containers. The prediction engine identifies a plurality of dependencies in the operations. The prediction engine develops a model of interdependencies based on the identified dependencies. The prediction engine determines one or more failure candidates in the identified dependencies. The prediction engine generates a software architecture template based on the identification of failure candidates.

In one embodiment, which may be combined with the preceding embodiment, the prediction engine identifies dependencies that occur between different software containers. The probability of dependency value is assigned to one or more of the identified dependencies that occur between different software containers. This feature provides an improvement to predicting models that include containers with interdependent relationships. The feature accounts for increasing scales of architectures. So, as architectures include more containers, predicting the use of some dependencies between different iterations of containers becomes more accurate.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Figure 1:
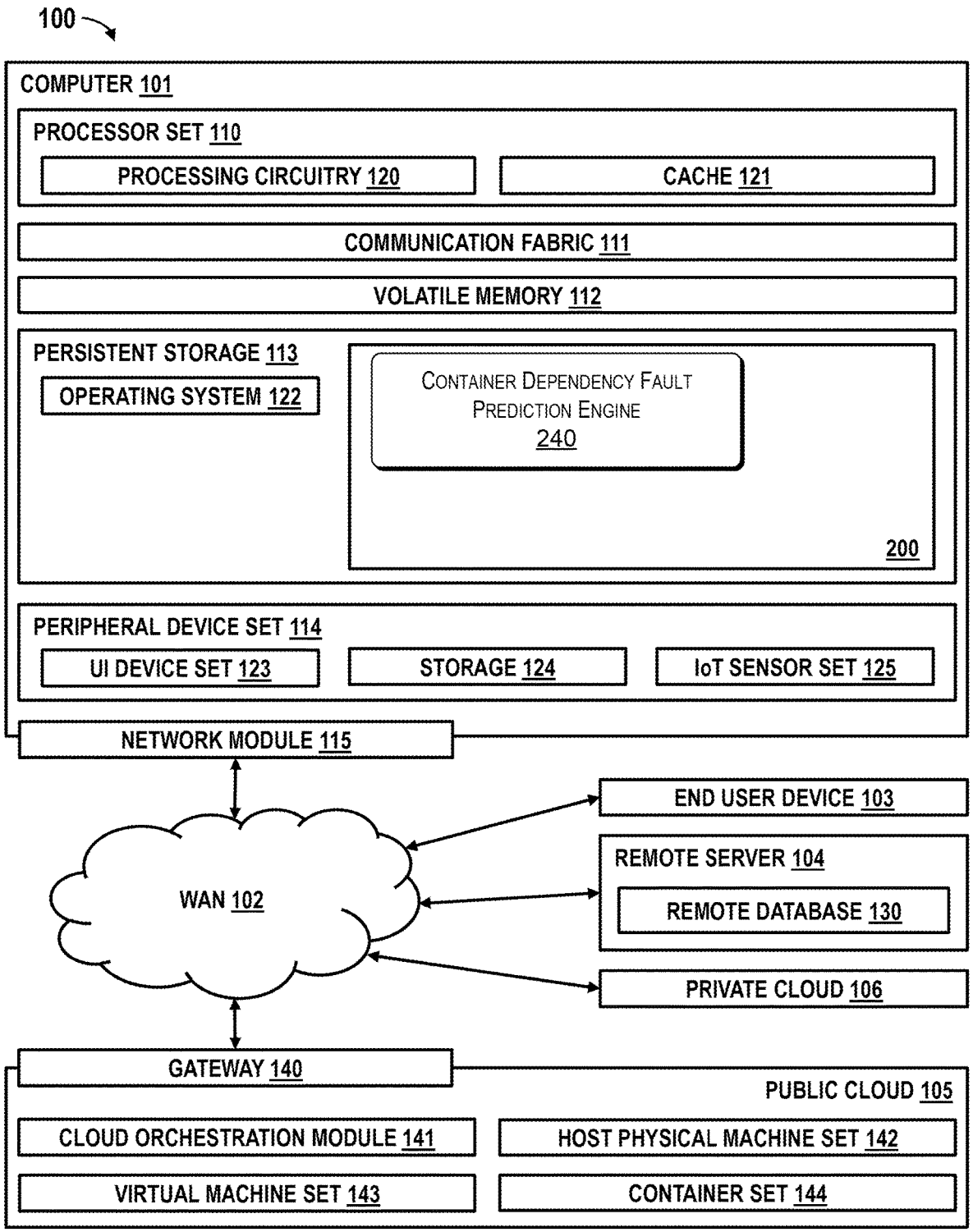
FIG. 1 is a block diagram of a computing environment for software container dependency operation according to an embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Definitions

Container, as used herein, refers to a unit of software that packages up code and all its dependencies.

Dependency, as used herein, refers to the relationship between two or more pieces of software code where the operation of one piece of code is at least partly determined by the operation of another piece of code.

Engine, as used, herein refers to software and/or hardware module that executes the foundation or crucial task for other programs.

Model or Modelling, as used herein, refers to a computing process used to predict outcomes by analyzing patterns in a given set of input data.

Anti-Pattern, as used herein, refers to a commonly-used process, structure or pattern of action that, despite initially appearing to be an appropriate and effective response to a problem, has more bad consequences than good ones. Typically, another solution exists to the problem the anti-pattern is attempting to address. This solution is documented, repeatable, and proven to be effective where the anti-pattern is not.

Template, as used herein, refers to the components identified in the system architecture, the technical infrastructure, and the dependency map of the components. The template contains the deployment typology, so this template can be used as a reference for future successful deployment.

Overview

The present disclosure generally relates to systems and methods for tuning software architecture. Degradation of a software architecture with multiple applications may occur for example, when a change in a software application version or library version occurs. The change may affect multiple elements if dependencies, whether direct or indirect, are affected by the change. As the scale of interdependent systems grows, the source of dependency failures/faults may be more difficult to track down. Moreover, predicting which or what kind of dependencies are the source of failure becomes more difficult. As will be appreciated, the subject technology is able to model dependencies regardless of scale and predict which dependency patterns are likely to result in a failure within a computing system. The results may be provided to other interdependent systems that have factors in-common with the subject system. The results will improve on computing technology by providing a troubleshooting mechanism that may aid systems administrators in designing, redesigning, or fixing the system architecture.

Importantly, although the operational/functional descriptions described herein may be understandable by the human mind, they are not abstract ideas of the operations/functions divorced from computational implementation of those operations/functions. Rather, the operations/functions represent a specification for an appropriately configured computing device. As discussed in detail below, the operational/functional language is to be read in its proper technological context, i.e., as concrete specifications for physical implementations.

Accordingly, one or more of the methodologies discussed herein may obviate a need for time consuming data processing by the user. This may have the technical effect of reducing computing resources used by one or more devices within the system. Examples of such computing resources include, without limitation, processor cycles, network traffic, memory usage, storage space, and power consumption.

It should be appreciated that aspects of the teachings herein are beyond the capability of a human mind. It should also be appreciated that the various embodiments of the subject disclosure described herein can include information that is impossible to obtain manually by an entity, such as a human user. For example, the type, amount, and/or variety of information included in performing the process discussed herein can be more complex than information that could be reasonably be processed manually by a human user.

Example Computing Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 includes an example of an environment for the execution of at least some of the computer code involved in performing the inventive methods, such as the improved interpretable prediction code 200. The improved interpretable prediction code 200 may include a plurality of code sub-programs or modules. For example, some embodiments include a container dependency fault prediction engine 240 that analyzes containers for software dependencies that have a high probability of failing in interdependent systems. In some embodiments, the container dependency fault prediction engine may generate a template based on the results of dependency analysis found for one system. The template may be provided to other software systems that may be found to have common factors in dependencies that lead to failure events. The container dependency fault prediction engine 240 may operate according to one or more of the methods disclosed in further detail below. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. For the instant disclosure, the processor set 110 includes for example a central processing unit (CPU) and an accelerator. In some embodiments, a different type of processing element may be used instead of the CPU, (for example, a GPU or other process dedicated/specialized unit). Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Example System Architecture

Figure 2:
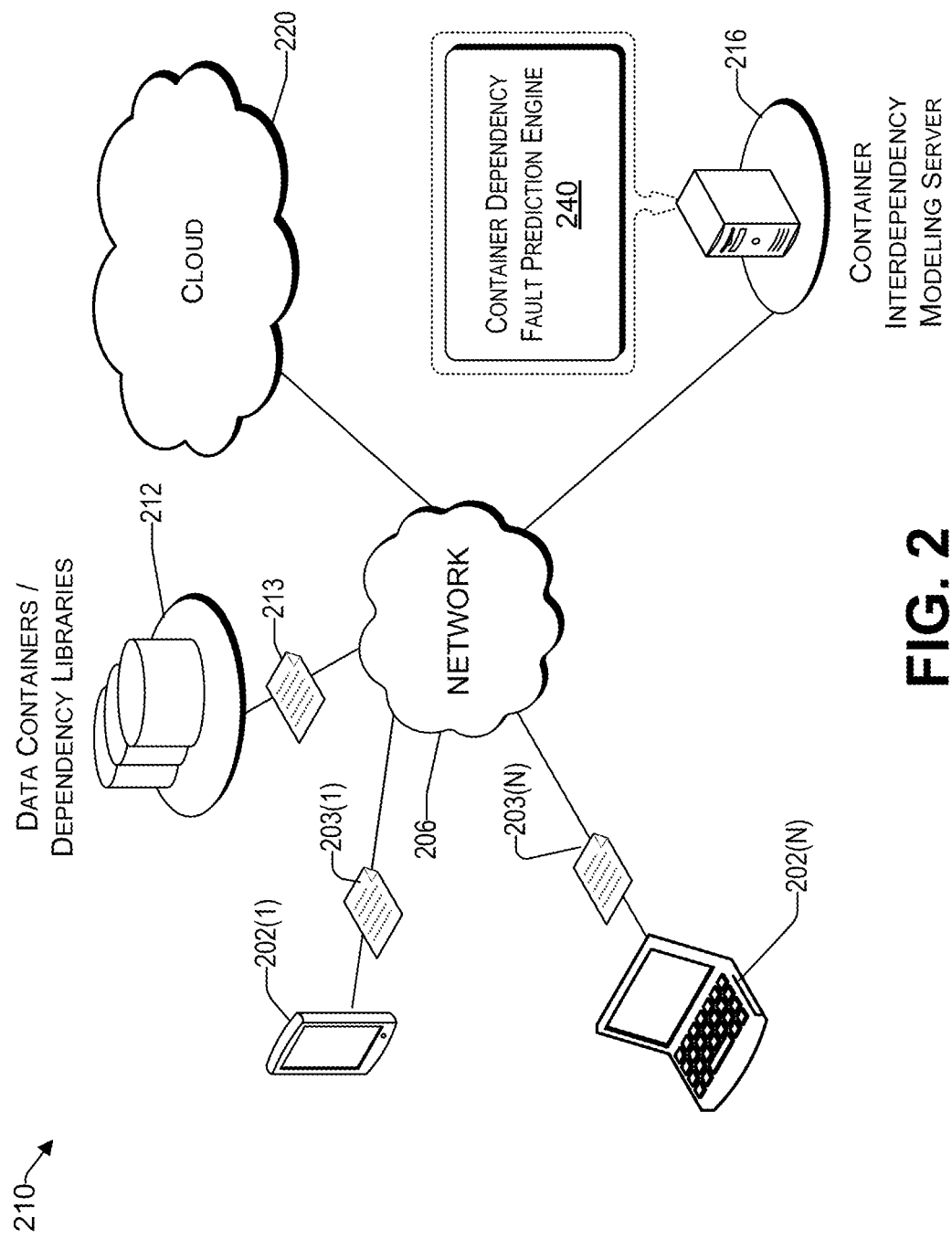
FIG. 2 is a block diagram of an architecture for tuning software container interdependent systems according to an embodiment.

FIG. 2 illustrates an example architecture 210 for tuning software container interdependent systems. Architecture 210 includes a network 206 that allows various computing devices 202(1) to 202(N) to communicate with each other, as well as other elements that are connected to the network 206, such as data source 212, a container interdependency modeling server 216, and the cloud 220. In some embodiments, the data source 212 may include libraries of software files and dependency calls in the software files. The computing devices 202(1) to 202(N) and container interdependency modeling server 216 may operate under the computing environment described above in FIG. 1. The container interdependency modeling server 216 may operate the code 200, including the module for the container dependency fault prediction engine 240.

The network 206 may be, without limitation, a local area network ("LAN"), a virtual private network ("VPN"), a cellular network, the Internet, or a combination thereof. For example, the network 206 may include a mobile network that is communicatively coupled to a private network, sometimes referred to as an intranet that provides various ancillary services, such as communication with various application stores, libraries, and the Internet. The network 206 allows the container dependency fault prediction engine 240, which is a software program running on the container interdependency modeling server 216, to communicate with the data source 212, computing devices 202(1) to 202(N), and/or the cloud 220, to provide data processing. The data source 212 may include source data being processed for inference and operations to be used in processing the source data, that will be processed under one or more techniques described here. In some embodiments, a data packet 213 may be received by the container dependency fault prediction engine 240. This data packet 213 can be received by the container dependency fault prediction engine 240 by either a push operation from the data source 212 or from a pull operation of the container dependency fault prediction engine 240. In one embodiment, the data processing is performed at least in part on the cloud 220.

For purposes of later discussion, several user devices appear in the drawing, to represent some examples of the computing devices that may be the source of data being analyzed depending on the task chosen. Aspects of the symbolic sequence data (e.g., 203(1) and 203(N)) may be communicated over the network 206 with the container dependency fault prediction engine 240 of the container interdependency modeling server 216. Today, user devices typically take the form of portable handsets, smart-phones, tablet computers, personal digital assistants (PDAs), and smart watches, although they may be implemented in other form factors, including consumer, and business electronic devices. While the data source 212 and the container dependency fault prediction engine 240 are illustrated by way of example to be on different platforms, it will be understood that in various embodiments, the data source 212 and the container interdependency modeling server 216 may be combined. In other embodiments, these computing platforms may be implemented by virtual computing devices in the form of virtual machines or software containers that are hosted in a cloud 220, thereby providing an elastic architecture for processing and storage.

Example Interdependent System

Figure 3:
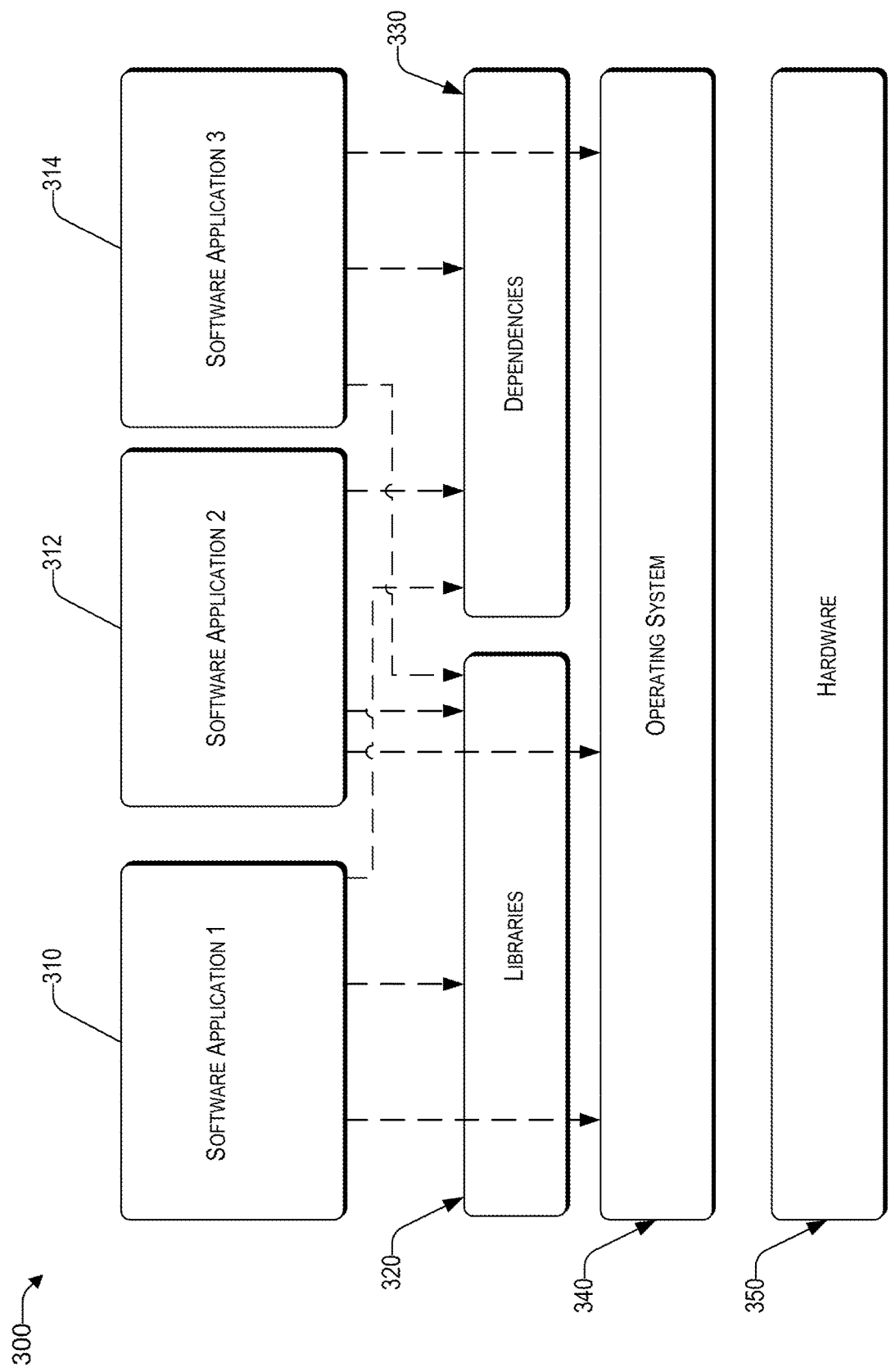
FIG. 3 is a diagrammatic view of an architecture for software container dependencies consistent with embodiments.

Reference now is made to FIG. 3, which illustrates a system 300 of software and hardware elements with interdependent dependencies. The system 300 represents an interdependent system where different elements of the system may operate under processes that affect or are affected by processes in one or more other elements in the system 300. For sake of illustration, only a single system 300 is shown. However, some embodiments include multiple systems 300 where dependencies may exist across the multiple systems. The system 300 includes a plurality of software applications 310, 312, and 314 that may operate concurrently in providing software processes to an operating system 340 and/or a piece of hardware 350 (for example, a computer processor). The system 300 may generally include a repository of libraries 320 and a repository 330 of dependencies that map associations between software code to other software code, libraries, and the operating system. The repositories 320 and 330 may be stored in a database (for example, the data source 212 of FIG. 2). The dashed line arrows represent operating relationships that may exist from each software application (310; 312; and 314) to another element in the system 300.

Example Methodology

Figure 4:
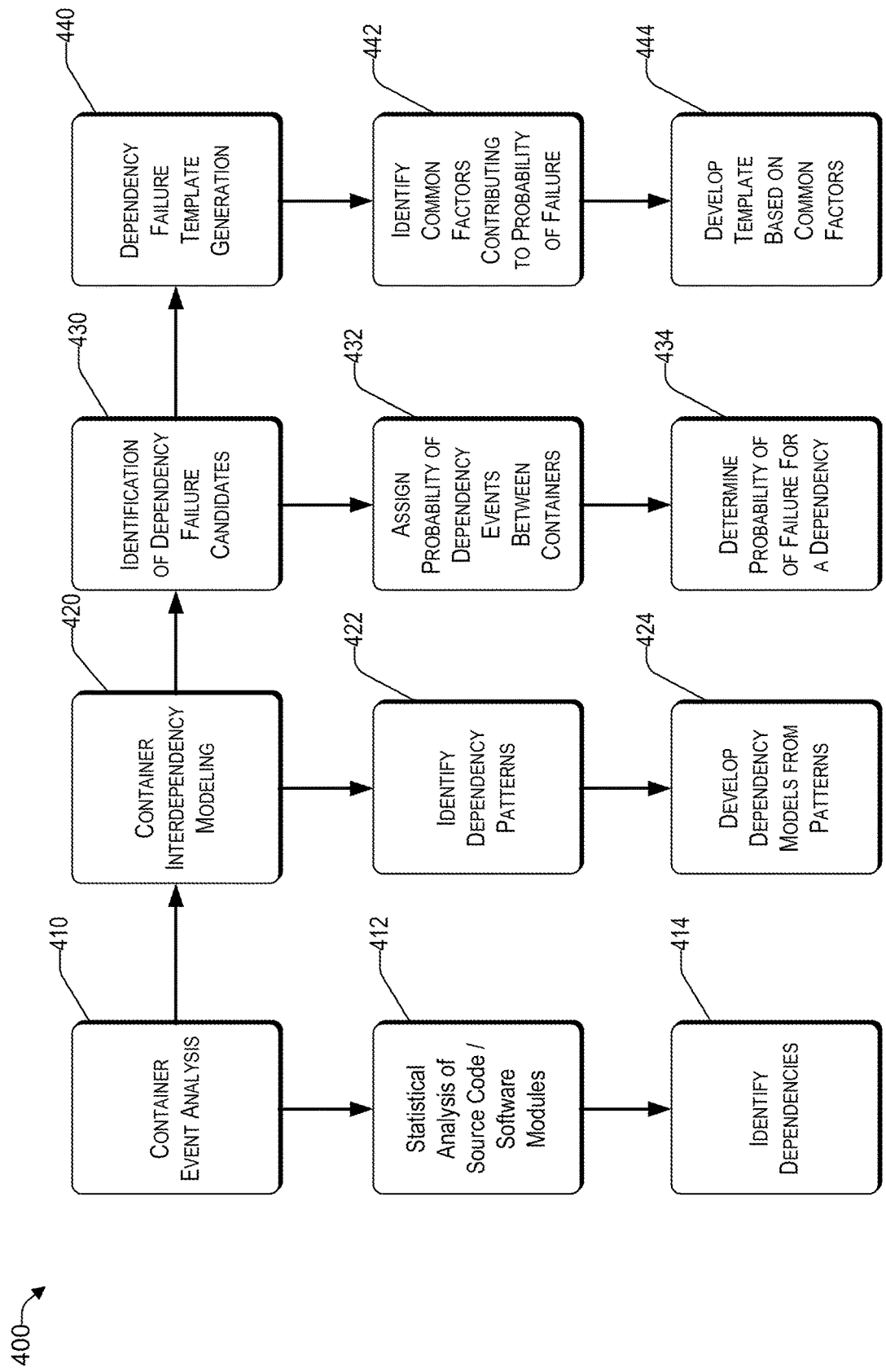
FIG. 4 is a flowchart of a method for tuning software container interdependent systems according to some embodiments.

FIG. 4 shows a method 400 of tuning software container interdependent systems according to an embodiment. The method 400 is generally a computer-implemented method whose actions may be performed by a computer processing unit (for example, the processor set 110 of FIG. 1), which may be resident on for example, the interdependency modeling server 216 shown in FIG. 2. As part of a software-based embodiment, the method 400 may be performed by a module (for example, the container dependency fault prediction engine 240 shown in FIG. 2). For illustrative purposes, the actions in the method 400 will be generally referred to as being performed by the container dependency fault prediction engine 240, unless otherwise noted.

The container dependency fault prediction engine 240 may analyze 410 one or more containers for events involving dependencies. Some embodiments may use a white box approach for the analysis. For example, the system 300 shown in FIG. 3 may be run under a simulation, or may be analyzed under normal operation within the system's end setting. As would be understood, the choice in white box approach depends on the intended goals of the analysis and the running environments' availability. The model may output whether container telemetry is dependent or independent, For example, the telemetry may performed for a container name and container identification. Using a system with an application server, a client, and a database as an example, each component is deployed in one container. The client depends on the server and the database. The client can be run correctly after the server and database are set up and running. In addition, there may be a separate container that deploys the rule engine. The rule engine only communicates with the database. An example of a rule may be, "replicate table A at midnight every night". In this case, the rule engine container is dependent on the database container but independent from the server and client containers. In some embodiments, the measure of dependency may be conducted using Bernard's, Chi-Squared, or Fisher's combined probability test. The selection of one test over another may depend on the type of data and the amount of data the invention system collects and analyzes. Bernard's tests are a class of hypothesis tests, also known as unconditional exact tests for two independent binomials. Fisher's test is a statistical significance test used in the analysis of contingency tables. A chi-squared test is a statistical hypothesis test used in the analysis of contingency tables when the sample sizes are large. In some embodiments, the analysis includes performing 412 a statistical analysis of events associated with the system's source code and/or any software modules in the container. For example, a plurality of operations involving the source code and/or software modules in the container may be run. The container dependency fault prediction engine 240 may observe what actions are taken by the source code. The container dependency fault prediction engine 240 may log any operation associated events. For example, any application programming interfaces (APIs) that were called into action may be logged. Connections between APIs may be logged. Connections from one software module to any other software module may be logged. From the statistical analysis, the container dependency fault prediction engine 240 may identify 414 dependencies that were invoked for any of the events that occurred while running the operations. In some embodiments, the dependencies may be tracked from the subject container to containers other than the subject container being evaluated. The dependencies may be mapped and stored in a dependency map file.

The container dependency fault prediction engine 240 may develop 420 an interdependency model of container elements ("container inter-dependency model CDIM"). In some embodiments, the model shows operational patterns that do not behave as expected (for example, trigger faults) within a container infrastructure. In some embodiments, the modeling includes dependency of elements between different containers and shows aberrantly operating inter-container dependencies. For example, the container dependency fault prediction engine 240 may identify 422 dependency patterns that form within or between containers. For example, when the application client always needs to depend on the application server being started successfully before it can be run correctly, the pattern may be an example exhibiting dependency. The container dependency fault prediction engine 240 may use the patterns to develop 424 one or more dependency models.

The container dependency fault prediction engine 240 may identify 430 dependency failure patterns and/or failure dependency candidates from the dependency models. Identifying failure candidates may include for example, assigning 432 a probability value to dependency events between containers. The probability value may depend on for example, the code execution sequence and the number of elements associated with a dependency. For example, if the application server is not started correctly, then the client will not start successfully. But if the database is not started correctly, the application client may still have a probability to be started correctly, but it may not be in a fully operational state. The container dependency fault prediction engine 240 may determine 434 the probability of failure for one or more of the dependencies using for example, the probability values. The probability of failure may depend on the overall system architecture. The threshold for failure may be configured depending on the use case of the system.

The container dependency fault prediction engine 240 may generate 440 a dependency failure template. In some embodiments, the model generated above may be generalized across a wider architecture than the specific implementation of the container(s) used when creating the template. An embodiment of the template generation process may include identifying by the container dependency fault prediction engine 240, common factors found that may contribute to the probability of failure for a given dependency that was evaluated. The common factors may include for example, the operating system used in the container, the application server type, the database type, the programming language used to develop the application client, and the cloud platform. Another example may be as specific as the software module version, too. Feature extraction may be performed to determine anti-patterns of system degradation as part of multi-concurrent container operations. The anti-patterns may be factors that cause the failure in the container deployment. The system 300 may track such failure causing factors so the dependency fault prediction engine 240 may recommend how to avoid certain issues for successful deployment. These anti-patterns are saved as templates. The templates are used as best deployment practice on what factors to avoid. The container dependency fault prediction engine 240 may develop 444 the template based on the common factors identified.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer implemented method for tuning software container interdependent systems, comprising:

receiving, by a computer processor operating a prediction engine, data from one or more software containers, wherein the data includes operations from one or more software applications in the software containers;

wherein the program instructions further comprise identifying, by the prediction engine, one or more of a plurality of dependencies that occur between different software containers, wherein a probability of dependency value is assigned to one or more of the identified plurality of dependencies that occur between different software containers, and identifying, by the prediction engine, a plurality of dependencies in the operations;

developing, by the prediction engine, a model of interdependencies based on the identified plurality of dependencies;

determining, by the prediction engine, one or more failure candidates in the identified plurality of dependencies;

performing, by the prediction engine, a statistical analysis of source code and the one or more software applications;

logging a plurality of operation associated events from the statistical analysis, wherein the identified one or more of plurality of dependencies are identified from the logged operation associated events; and generating, by the prediction engine, a software architecture template operative to be used as a reference for successful deployment of a software based on the one or more failure candidates.

2. The method of claim 1, further comprising determining a probability of failure for one or more of the logged operations associated events, wherein the one or more failure candidates are determined based on the probability of failure.

3. The method of claim 1, further comprising identifying, by the prediction engine, common factors in the plurality of dependencies, wherein the software architecture template is generated based on the common factors identified.

4. The method of claim 1, further comprising identifying, by the prediction engine, anti-patterns in the operations, wherein the software architecture template is generated based on the anti-patterns identified.

5. A computing device configured to tune software container interdependent systems, comprising:
a computer processor operating a prediction engine; and
a memory coupled to the computer processor, the memory storing instructions to cause the computer processor to perform acts comprising:
receiving, by the computer processor operating the prediction engine, data from one or more software containers, wherein the data includes operations from one or more software applications in the software containers;
wherein the program instructions further comprise identifying, by the prediction engine, one or more of a plurality of dependencies that occur between different software containers, wherein a probability of dependency value is assigned to one or more of the identified plurality of dependencies that occur between different software containers, and identifying, by the prediction engine, a plurality of dependencies in the operations;
developing, by the prediction engine, a model of interdependencies based on the identified plurality of dependencies;
determining, by the prediction engine, one or more failure candidates in the identified plurality of dependencies;
performing, by the prediction engine, a statistical analysis of source code and the one or more software applications;
logging a plurality of operation associated events from the statistical analysis, wherein the identified one or more of plurality of dependencies are identified from the logged operation associated events; and
generating, by the prediction engine, a software architecture template operative to be used as a reference for successful deployment of a software based on the one or more failure candidates.

6. The computing device of claim 5, wherein the instructions cause the processor to perform further acts comprising determining a probability of failure for one or more of the logged operations associated events, wherein the one or more failure candidates are determined based on the probability of failure.

7. The computing device of claim 5, wherein the instructions cause the processor to perform further acts comprising identifying by the prediction engine, common factors in the plurality of dependencies, wherein the software architecture template is generated based on the common factors identified.

8. A computer program product for tuning software container interdependent systems, the computer program product comprising:
one or more non-transitory computer readable storage media, and program instructions collectively stored on the one or more non-transitory computer readable storage media, the program instructions comprising:
receiving, by a computer processor operating a prediction engine, data from one or more software containers, wherein the data includes operations from one or more software applications in the software containers;
wherein the program instructions further comprise identifying, by the prediction engine, one or more of a plurality of dependencies that occur between different software containers, wherein a probability of dependency value is assigned to one or more of the identified plurality of dependencies that occur between different software containers, and identifying, by the prediction engine, a plurality of dependencies in the operations;
developing, by the prediction engine, a model of interdependencies based on the identified plurality of dependencies;
determining, by the prediction engine, one or more failure candidates in the identified plurality of dependencies;
performing, by the prediction engine, a statistical analysis of source code and the one or more software applications;
logging a plurality of operation associated events from the statistical analysis, wherein the identified one or more of plurality of dependencies are identified from the logged operation associated events; and
generating, by the prediction engine, a software architecture template operative to be used as a reference for successful deployment of a software based on the one or more failure candidates.

9. The computer program product of claim 8, wherein the program instructions further comprise determining a probability of failure for one or more of the logged operations associated events, wherein the one or more failure candidates are determined based on the probability of failure.

10. The computer program product of claim 8, wherein the program instructions further comprise identifying, by the prediction engine, common factors in the plurality of dependencies, wherein the software architecture template is generated based on the common factors identified.

11. The computer program product of claim 8, wherein the program instructions further comprise identifying, by the prediction engine, anti-patterns in the operations, wherein the software architecture template is generated based on the anti-patterns identified.

\* \* \* \* \*